(12) United States Patent
Mrsny

(10) Patent No.: US 6,523,575 B1
(45) Date of Patent: Feb. 25, 2003

(54) GUTTER OUTLET TUBE, STAMPING DIES AND METHOD

(75) Inventor: Mitchell S. Mrsny, Denver, CO (US)

(73) Assignee: M&B Manufacturing, Commerce City, CO (US)

( * ) Notice: Subject to any disclaimer, the term of this patent is extended or adjusted under 35 U.S.C. 154(b) by 0 days.

(21) Appl. No.: 09/713,113

(22) Filed: Nov. 15, 2000

(51) Int. Cl.$^7$ .................................................. F16L 9/22
(52) U.S. Cl. ....................... 138/109; 138/155; 138/156; 138/159
(58) Field of Search ................................ 138/109, 156, 138/155, 159, 169

(56) References Cited

U.S. PATENT DOCUMENTS

| | | | | |
|---|---|---|---|---|
| 1,374,866 A | * | 4/1921 | Spencer | 138/DIG. 4 |
| 2,216,864 A | * | 10/1940 | Wasmund | 138/DIG. 4 |
| 2,359,725 A | * | 10/1944 | Berger et al. | 138/163 |
| 2,627,430 A | * | 2/1953 | Koffler | 138/168 |
| 2,882,072 A | * | 4/1959 | Noland | 138/109 |
| 3,076,669 A | * | 2/1963 | Schlein | 138/121 |
| 3,212,529 A | * | 10/1965 | Ullman et al. | 138/145 |
| 3,545,496 A | * | 12/1970 | Wogerbauer | 138/171 |
| 4,328,694 A |   | 5/1982 | Beaumont | |
| 4,735,235 A | * | 4/1988 | Anderson et al. | 138/109 |
| 5,316,165 A | * | 5/1994 | Moran, Jr. | 220/62 |
| 5,878,786 A | * | 3/1999 | Elder | 138/163 |
| 6,311,735 B1 | * | 11/2001 | Small, Sr. | 138/119 |

OTHER PUBLICATIONS

Author: Mr. Gutter, Inc., Title: A Revolutionary New Concept In 3x4 Downspout Outlet Tubes, Date: 1986, pp.: 4 total.

* cited by examiner

Primary Examiner—James Hook
(74) Attorney, Agent, or Firm—Rick Martin; Patent Law Offices of Rick Martin, P.C.

(57) ABSTRACT

An outlet tube comprising a unitary material sheet folding into a rectangular shape and having overlapping ends secured with rivets, the outlet further including flanges extending outwardly from one end of the walls of the rectangular shape, and slots at the upper and lower fold lines to accommodate irregular shaped holes via bending of the sides of the outlet tube. Three sizes of flat blanks handle all gutter common hole sizes, and these blanks are made by one die assembly, which include holes on flange to allow riveting to the floor or the gutter.

7 Claims, 14 Drawing Sheets

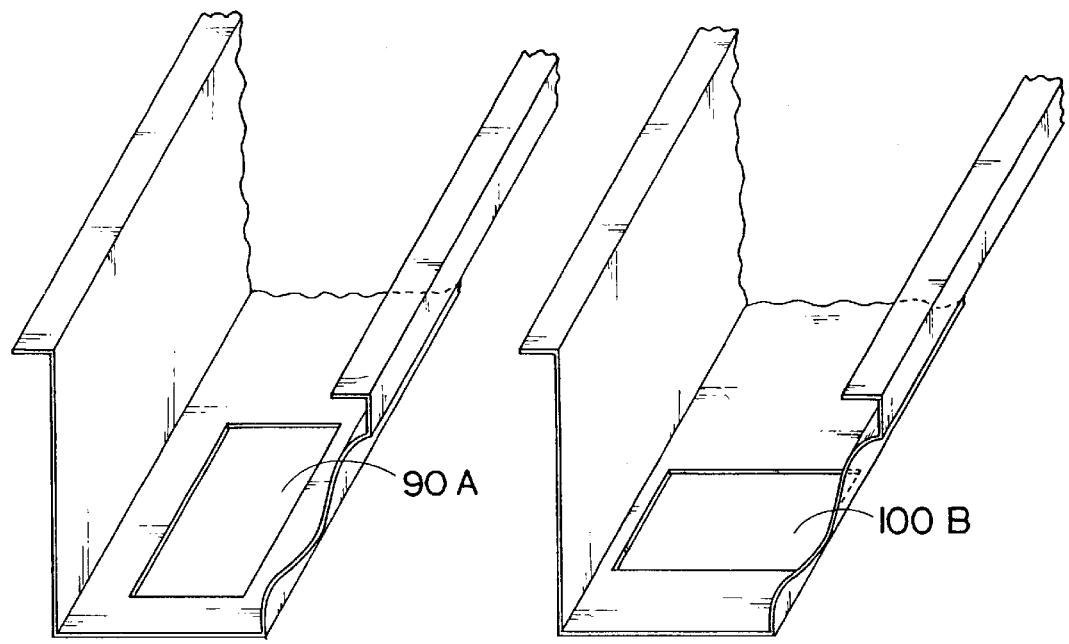
FIG. 9
(PRIOR ART)
FIG. 10
(PRIOR ART)
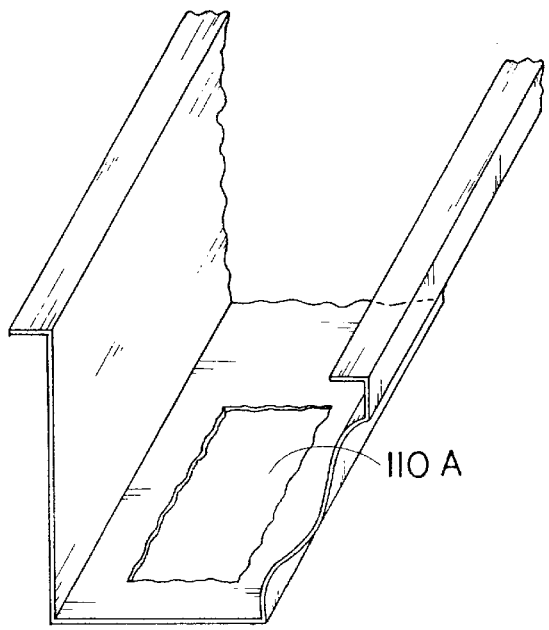
FIG. 11
(PRIOR ART)

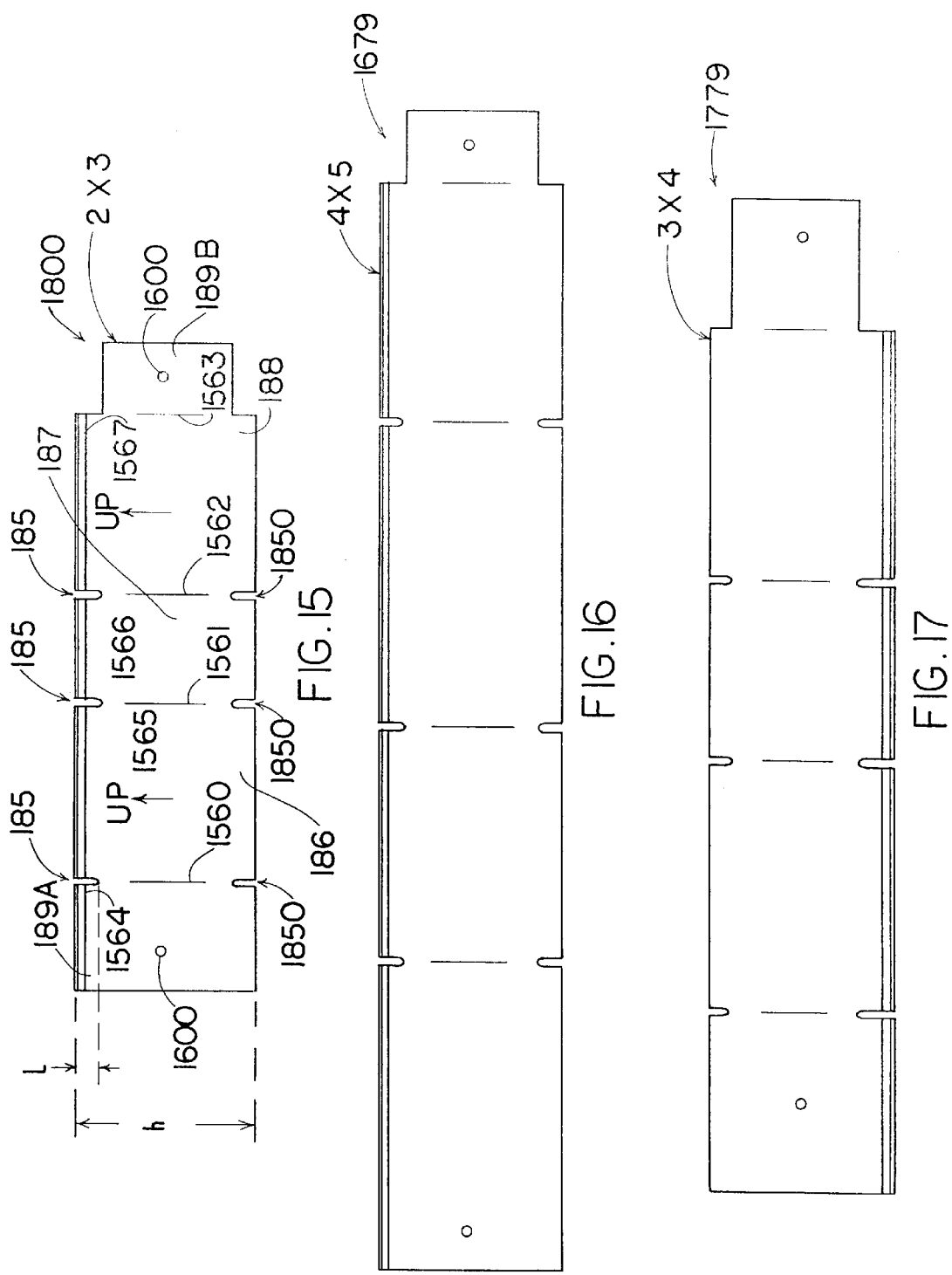

|  | K STYLE 4" | | K STYLE 5" | | K STYLE 6" | | BOX STYLE 7" | | K STYLE 8" | |
|---|---|---|---|---|---|---|---|---|---|---|
|  | A | B | A | B | A | B | A | B | A | B |
| 2 X 3 | Y | Y ADJ. AND BEND | Y | Y | Y | Y | Y | Y | Y | Y |
| ③ PRIOR ART | | | | | | | | | | |
| 3 X 4 | N | N | Y | Y TRIM | Y | Y TRIM | Y | Y | Y | Y |
| PRIOR ART | | | | ① | ④ | ④ ② | ④ | ④ ② | ④ | ④ ② |
| 4 X 5 | N | N | N | N | Y | N | Y | Y | Y | Y TRIM |
| ③ PRIOR ART | | | | | | | | | | |

① — OLD STYLE WILL NOT WORK

② — OLD STYLE REQUIRES TRIMMING

③ — NOT AVAILABLE IN PRIOR ART

④ — OLD STYLE SAME WILL FIT

Y — FITS

N — DOES NOT FIT

FIG. 19

GUTTER OUTLET TUBE, STAMPING DIES AND METHOD

FIELD OF THE INVENTION

The present invention relates to rain gutter outlet tubes that are shipped flat and assembled in the field into rectangular fixtures, wherein the various embodiments provide for handling irregular shaped gutter holes, and three sizes of flat blanks handle most if not all gutter sizes.

BACKGROUND OF THE INVENTION

The present invention relates to the field of gutters and downspouts, and in particular to an outlet tube for connection of a downspout with a gutter, and a method for making the same.

The typical prior art gutter systems include a gutter which is mounted horizontally on the eaves of a building, and a downspout which is connected with the gutter and directed vertically along the building to deliver the water to the ground. The downspout is connected with the gutter by an outlet tube which is a generally rectangular shaped box which is open at both ends and which at the top end includes outwardly extending flanges for reception upon the floor of the gutter for securement of the outlet tube to the gutter.

In the prior art, one method for making the outlet tube is a "deep drawing" process in which the appropriate metal is drawn through dies or a series of progressive dies, and is then passed through a "cut die" to remove any extraneous material. Aluminum, painted steel and copper is the common material for making outlet tubes, and in the deep drawing process is used as a "zero hard" alloy which provides a composition which will not crack in the drawing process. In the process of forming the outlet tube in the punch press dies, the aluminum is work hardened and, therefore, the zero hard alloy is required. Because of these special requirements of the deep drawing process on the properties of the metal, the material costs for this process are high. It is, therefore, desirable to provide an outlet tube, and a method for making the same, which does not require special alloys and which also is simple and readily accomplished without expensive machinery.

U.S. Pat. No. 4,328,694 teaches a flanged outlet tube provided for mounting within a gutter to provide a connection with a downspout, which includes a rectangular member which is a unitary piece folded at four corners and including five wall portions, the two end wall portions being secured together to form the rectangular shape. The member further includes flanges which are unitary with the wall portions of the rectangular member, which flanges extend outwardly of the wall portions. In a related aspect of the '694 invention, a method and structure are provided for tapering the wall portions inwardly at a location opposite the flanges, and methods are also provided for making the same.

The '694 invention provides a method for the formation of an outlet tube which utilizes a flat sheet of material which can therefore be easily, inexpensively and compactly packaged for shipping, and which also provides for the simple and precise formation of an outlet tube therefrom.

The '694 invention does not readily accommodate irregular holes, nor does it have a manufacturing method and die to create three sized blanks to handle virtually all gutter sizes and orientations of holes.

The present invention consists of a single die assembly with interchangeable modes that produce three sizes of blanks which fit virtually all gutter holes. Each blank has novel slots and provides scores to enable hand bending the sides to fit irregular shaped holes.

SUMMARY OF THE INVENTION

The main aspect of the present invention is to provide a hand bendable flat blank having scores which enable a gutter outlet to be formed, wherein the sides of the gutter outlet are readily bendable to fit irregular shaped holes.

Another aspect of the present invention is to provide a hole and/or hole marking on the flange to facilitate riveting to the floor of the gutter.

Another aspect of the present invention is to provide a die and method of manufacture to produce three sized blanks which fit virtually all gutter holes and orientations.

Another aspect of the present invention is to provide three different sizes of blanks to cover virtually most common downspout sizes.

A single die with movable stops and pins can produce three different blanks, each having unique slots, wherein the blanks are hand foldable into gutter outlet tubes. The sizes of the blanks are approximately for holes having dimensions of 2"×3", 3"×4" and 4"×5". Virtually all size gutters, A and B holes orientations and hole sizes are accommodated by these three blanks and their cost saving method of manufacture.

Other aspects of this invention will appear from the following description and appended claims, reference being made to the accompanying drawings forming a part of this specification wherein like reference characters designate corresponding parts in the several views.

BRIEF DESCRIPTION OF DRAWINGS

FIG. 9 (prior art) is a top perspective view of an A style (longitudinal) downspout hole in a K style gutter.

FIG. 10 (prior art) is a top perspective view of a B style (cross way) downspout hole in a K style gutter.

FIG. 11 (prior art) is a top perspective view of an A style irregular shaped hole in a K style gutter.

FIG. 15 is a top plan view of the 2×3 inch blank, the preferred embodiment.

FIG. 16 is a top plan view of the 4×5 inch blank, the preferred embodiment.

FIG. 17 is a top view of the 3×4 inch blank, the preferred embodiment.

FIG. 19 is a chart showing the three common gutter sizes and a comparison of the prior art capabilities to fit the various gutter holes.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF DRAWINGS

Figure 1:
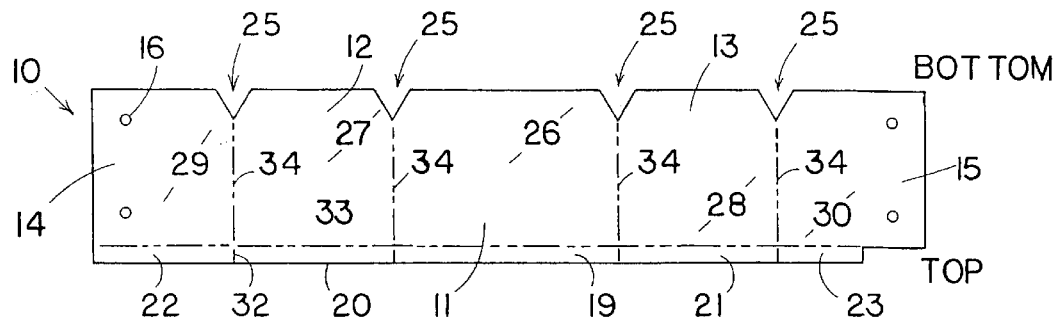
FIG. 1 (prior art) is a top plan view of a blank having V shaped cutouts on one edge and stamped fold lines to facilitate hand bending the blank into a gutter outlet tube.
Figure 2:
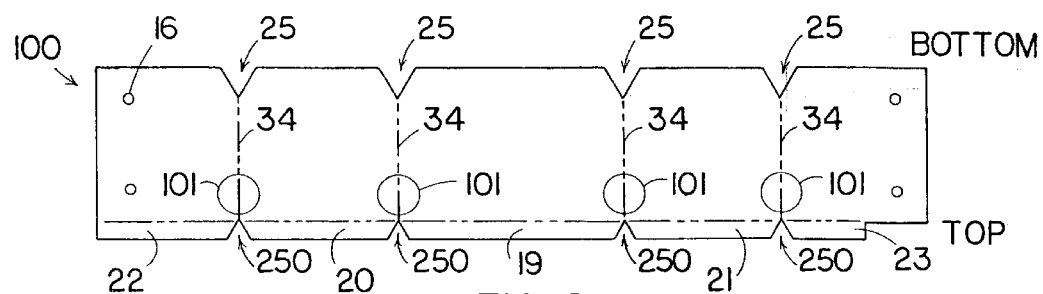
FIG. 2 (prior art) is a top plan view of a blank having V shaped cutouts on both longitudinal edges.
Figure 3:
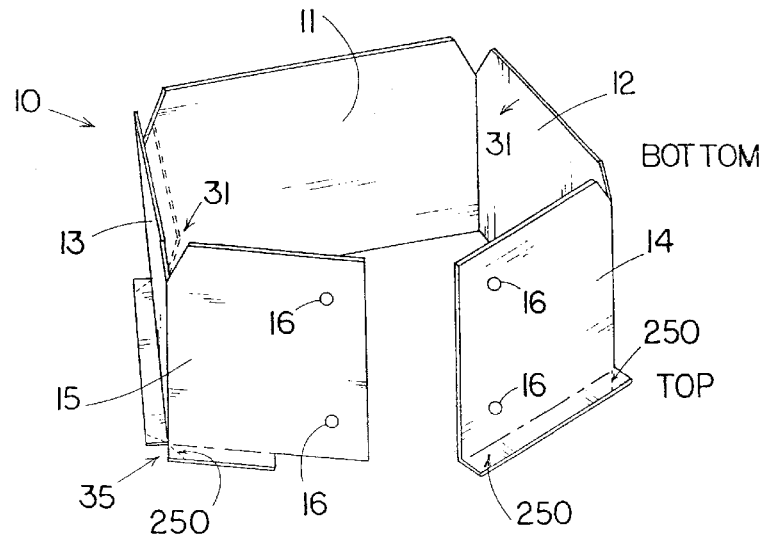
FIG. 3 (prior art) is a top perspective view of the blank of FIG. 1 partially folded into a gutter outlet tube.

Referring first to prior art FIGS. 1–3, there is shown an outlet tube 10. The outlet tube 10 comprises a rectangular member which is open at both ends and which comprises a unitary piece of material folded into the desired shape. In the partially folded condition as shown in FIG. 3, the rectangular outlet tube includes four corners which define a rear wall portion 11, sidewall portions 12 and 13 and front wall portions 14 and 15. The end portions of the unitary material are the front wall portions 14 and 15, and they are combined to define the front wall of the outlet tube.

Securement means are provided for securing the front wall portions 14 and 15 together to complete the rectangular shape of the outlet tube. In the preferred embodiment, the front wall portions 14 and 15 include overlapping portions which define two pairs of aligned holes 16, within which rivets 17 (see FIGS. 20,21) are received in normal fashion. It will be appreciated that other means may be used to form the connection between the front wall portions, but the defined method is preferred since the use of rivets is common in this art and for the people who would be installing the outlet tube, and provides a quick and simple connection which will stay secured during use.

As is well understood, the outlet tube is received within an aperture in the bottom wall of a gutter. The outlet tube includes flanges 19–23 which extend outwardly of the rectangular box and are received against the upper surface of the gutter floor. The flanges 19–23 extend outwardly from the wall portions 11–15, respectively. It will be appreciated, however, that only one of the front wall portions 14 and 15 need have the outwardly extending flange, depending upon the extent to which a single front wall portion spans the front of the outlet tube. Thus, the front wall portion 14 could be approximately equal in length to the rear wall portion 11 and the other front wall portion 15 could have only a minor extension along the front of the outlet tube. In this configuration, the front wall portion 14 could carry the outwardly extending flange with the other front wall portion 15 not including a flange. However, to provide a simple and sure connection of the front wall portions, and to facilitate insertion of the outlet tube into the gutter opening and of the downspout 24 over the outlet tube, it is desirable to have the connection spaced inwardly of the corners and to have each of the front wall portions include an outwardly extending flange, such as 22 and 23.

The outlet tube includes rounded or V-shaped notches 25 at the bottom aligned with the corners of the outlet tube. The presence of these notches permits the unfolded portions 26–30 extending therebetween to be folded inwardly, as shown at 31 in FIG. 3, to provide an inward taper of the rectangular outlet tube at the bottom end away from the flanges. The tapered bottom may be desirable to facilitate insertion of the downspout over the rectangular box portion of the outlet tube. The V-shaped notches provide a chamfered corner to the bottom ends of the wall portions to permit this inward bending of these bottom ends to form the taper.

Referring in particular to FIGS. 1–3, a method for constructing the outlet tube of the prior art invention is shown in consecutive steps. A unitary, flat member is provided (FIG. 1) which includes an edge in which four spaced apart separation regions are provided. Preferably, these separation regions comprise score lines 32 which will permit a ready separation of the material along those lines. It will be appreciated that the separation regions may as well be cuts extending inwardly of the edge, serrated portions or actual notches. However, the score line approach is preferred since it helps to maintain the integrity of the flat member prior to assembly as an outlet tube. This is particularly true since the member is preferably folded in an L-shape along a fold line 33 prior to shipping. If the separation regions 32 comprise notches or cut slits, then in the L-shaped configuration the member may readily fold at the location of the separation regions, whereas a score line will inhibit the member from folding at this location until it is desired for assembly.

In the prior art method of preparing the outlet tube, the L-shaped member is then folded at the positions corresponding to the separation regions, such as at a fold line which then define the corners of the rectangular outlet tube. In the embodiment in which the separation regions comprise score lines, the folding of the L-shaped member will cause the material to break along the score lines to form the openings 35 which permit the material to fold and which define the edges of the flanges. Once the member has been folded at each of the corner locations 34, as shown in FIG. 3, the end wall portions 14 and 15 are secured together to form the rectangular shape. As previously indicated, a preferred securement means is the provision of holes on the front wall portions 14 and 15 which align when the wall portions are overlapped, and rivets are then inserted through the holes to secure the wall portions together.

It will be appreciated that the steps in the method of preparing the outlet tube may be varied to a certain extent. Primarily, the flat member of FIG. 1 could be folded along the corner locations 34 prior to the folding up of the flange area along the fold line 33. Once in the rectangular shape, each of the flanges could individually be folded outwardly to form the final configuration. It is preferred, however, that the member first be folded into the L-shaped configuration for two primary reasons. First, the member may be folded into the L-shaped prior to shipping, and particularly in combination with the use of score lines as opposed to actual separations will help to maintain the member in the desired shape without bending. Also, the folding of the member first into the L-shape, in combination with the use of score lines, will cause the flanges to automatically separate at the corner locations when the member is folded into the rectangular shape.

Referring to FIG. 2 the added TOP notches 250 are the only difference is embodiment 100. These notches 250 form angled ends of the flanges 19–23 as shown in FIG. 3 with dotted lines 250 showing what the flange would look like. It should be noted that within circles 101, no slots are taught. Circles 101 are located at the top edge of the gutter outlet tube adjacent the flanges.

Figure 4:
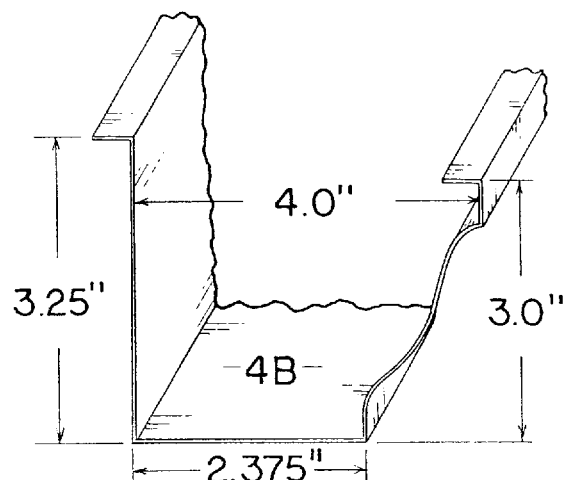
FIG. 4 (prior art) is a perspective end view of a four inch K style gutter.
Figure 5:
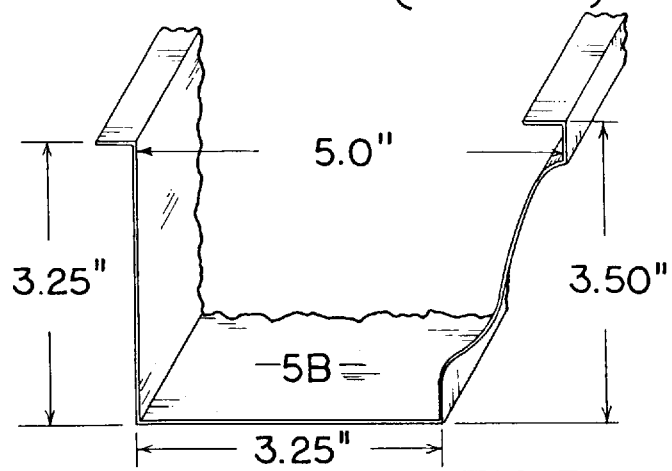
FIG. 5 (prior art) is a perspective end view of a five inch K style gutter.
Figure 6:
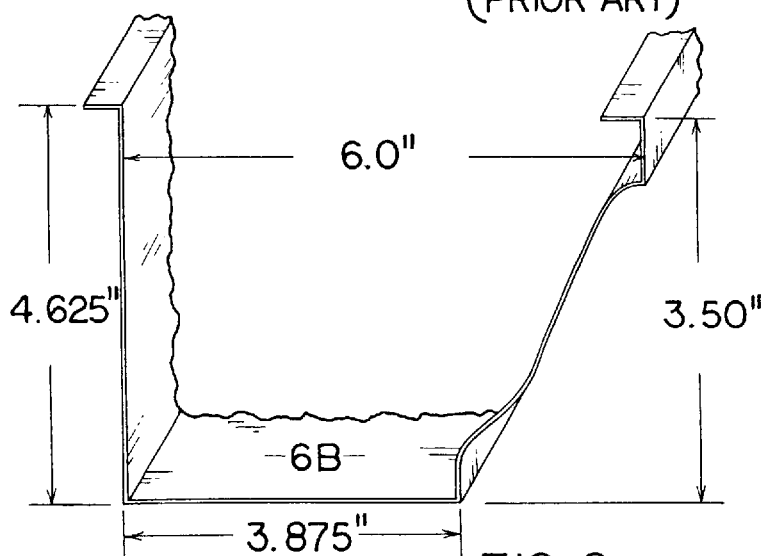
FIG. 6 (prior art) is a perspective end view of a six inch K style gutter.
Figure 8:
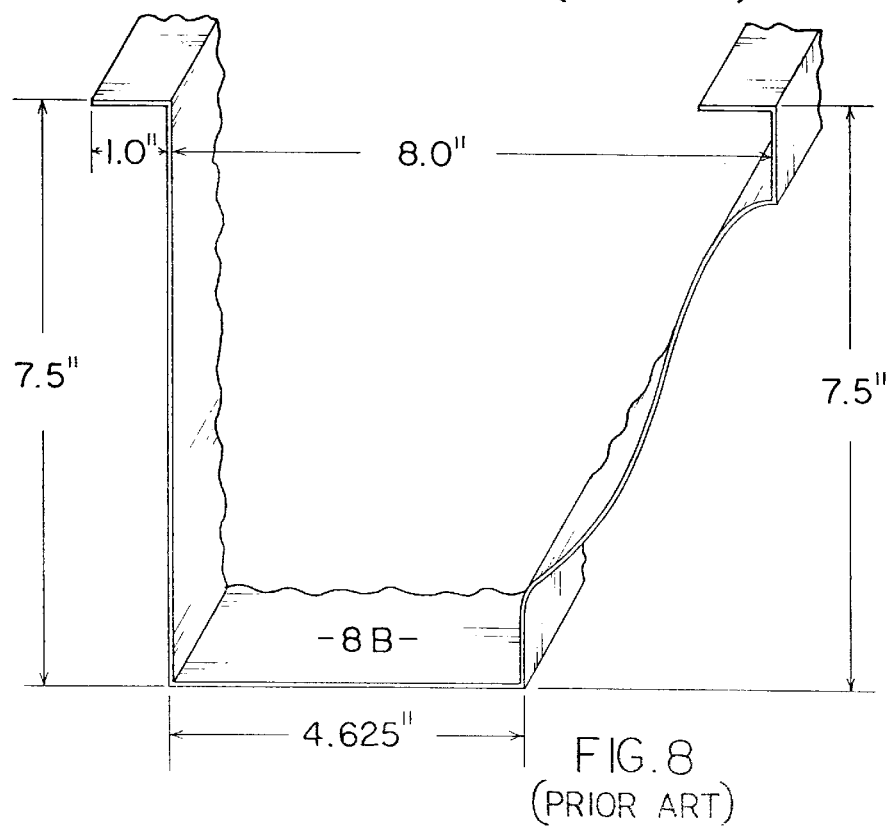
FIG. 8 (prior art) is a perspective end view of an eight inch K style gutter.

Referring next to prior art FIGS. 4–6 and 8, a "k" style gutter is shown in various sizes. FIG. 4 shows a "4 inch" gutter having a base 4B with a 2⅜" depth. FIG. 5 shows a "5 inch" gutter having a base 5B with a 3¼" depth. FIG. 6 shows a "6 inch" gutter with a 3⅞" depth. FIG. 8 shows an "8 inch" gutter having a base 8 B with a 4⅝" depth.

Figure 7:
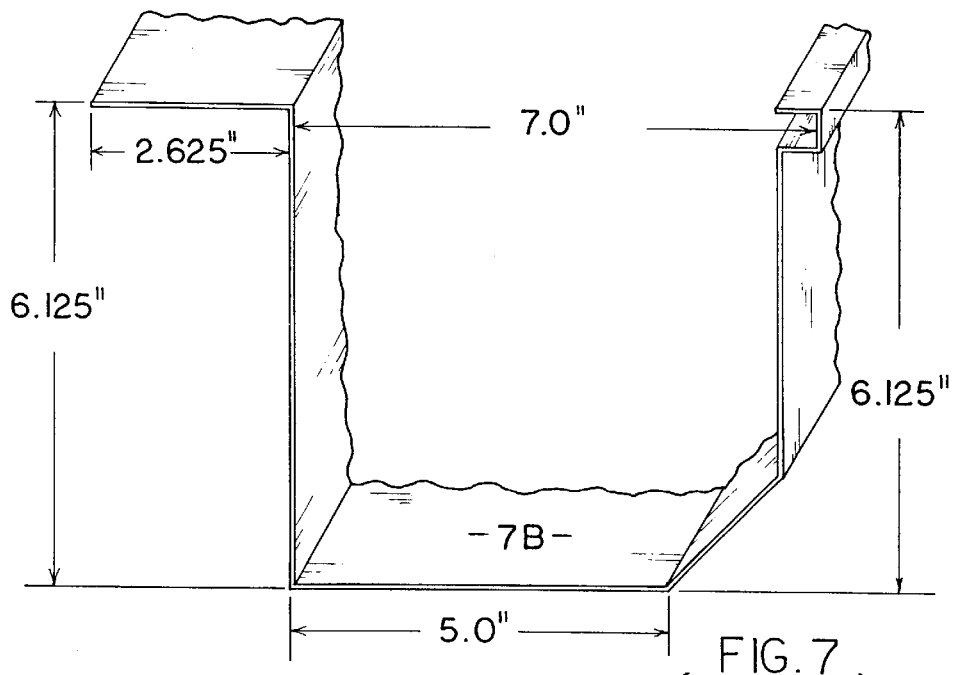
FIG. 7 (prior art) is a perspective end view of a seven inch box style gutter.

In FIG. 7 a "box" style 7 inch gutter is shown. The base 7B has a 5" depth. All of the above noted gutters require a different sized gutter outlet tube. In FIGS. 9–11 the two different hole orientations for the gutter outlet tube is shown. Hole 90A in FIG. 9 is an "A" orientation. Hole 100B in FIG. 10 is a "B" orientation. Hole 110A in FIG. 11 is a rough cut or irregular cut hole with an "A" orientation. From the above illustrations it is seen that a supplier of gutter outlet tube blanks is challenged to economically provide all the variety of sizes for the gutter installer. Another challenge is to accommodate irregular holes such as hole 110A of FIG. 11.

Figure 18:
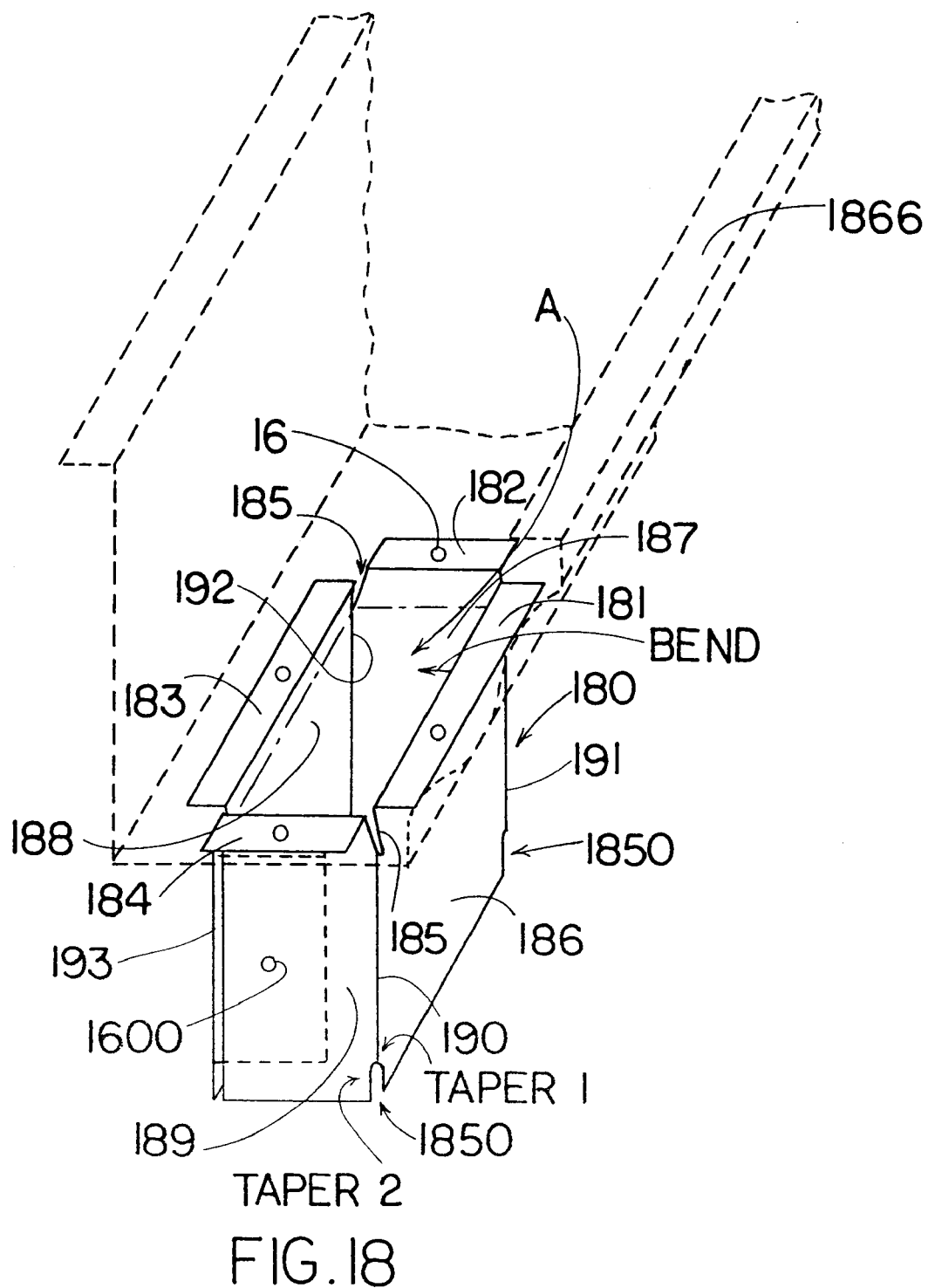
FIG. 18 is a top perspective view of a K style gutter with the folded blank installed and hand bent to accommodate an irregular hole.

Referring to FIG. 18 shows the preferred embodiment solution to the irregular hole. A gutter outlet tube 180 has traditional upper flanges 181–184 and rivet holes 16, a front wall 186, a rear wall 188, walls 187,189 and a rivet hole 1600 to fasten the side wall segments together at side wall 189. The novel slot 185 is located at the top of corner 190, and a similar slot is located at the top of the other corners 191,192,193. The gutter 1866 had an irregular hole which is now filled with the gutter outlet tube 180. An upper segment of front wall 186 has been hand bent in direction BEND. This fraction of an inch bend has accommodated a hole cut too narrow. Not shown is the reverse direction bend to accommodate a hole cut too wide. The slots 185 enable this simple solution to an old problem of accommodating irregular holes. The slots can range in size from ¼ to ¾ inch. The sides 187,189 can also be adjusted in the same manner. Optional slots 1850 are located at the bottom of each corner. These slots enable the front, back and sides to be hand bent slightly inward as shown by arrows TAPE 1, TAPE 2 to form a tapered bottom hole on the gutter outlet tube. This taper may facilitate the engagement of a downspout.

Referring next to FIG. 15 the blank 1800 is used to hand fold the completed gutter outlet tube 180 shown in FIG. 18. Side segments 189A and 189B are joined by a rivet (not shown) through holes 1600. Fold lines 1560,1561,1562, 1563 form corners 190,191,192,193 respectively. Fold lines 1564,1565,1566,1567 form flanges 184,181,182,183 respectively, wherein the flanges may be bent at the factory or in the field. The slots 185 have a length about 10% of the height h of the blank 1800. However, 1/h could range between 5 and 20%. Although this gutter outlet tube is called a 2x3, the actual hole H dimensions (see FIG. 18) are 1½x2½ inches.

Referring next to FIG. 16 an equivalent blank 1679 is shown approximately to scale as a 4x5 inch blank having actual dimensions for the hole H of 3¼x4½ inches.

Referring next to FIG. 17 an equivalent blank 1779 is shown approximately to scale as a 3x4 inch blank having actual dimensions for the hole H of 2⅓x3¾ inches.

Referring next to the chart 1900 in FIG. 19 the three blanks shown in FIGS. 15,16,17 are each represented by a horizontal row. The 4 though 8 inch sizes and styles are represented by columns. The present invention offers three different sized blanks which fit all gutters hole sizes and orientations for the listed gutters (4,5,6 and 8 inch) style, and 7 inch box style).

Figure 20:
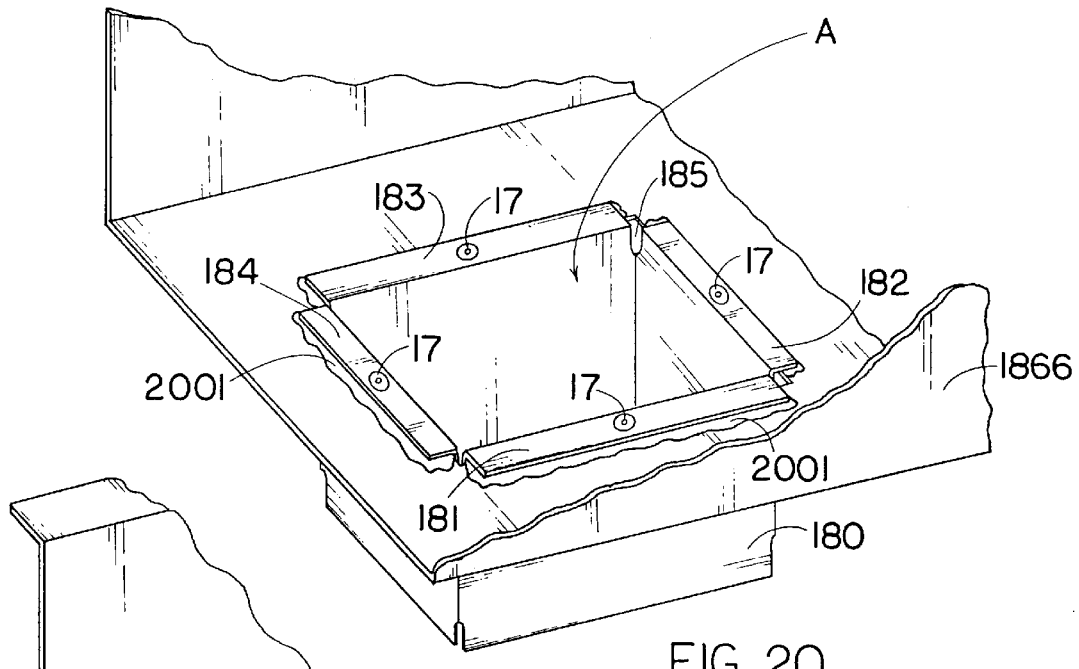
FIG. 20 is a top perspective view of a preferred embodiment completed gutter outlet tube installed in an A style hole.
Figure 21:
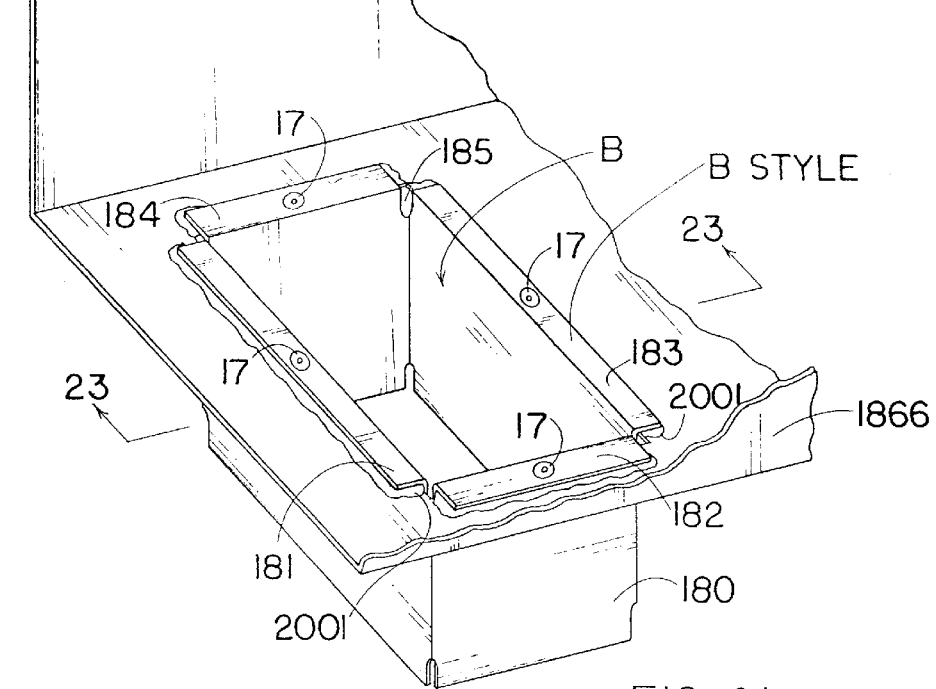
FIG. 21 is a top perspective view of a preferred embodiment completed gutter outlet tube installed in a B style hole.

Referring next to FIGS. 20,21 the same gutter outlet tube 180 shown in FIG. 18 is shown installed in a properly sized A oriented hole (FIG. 20) and B oriented hole (FIG. 21). Rivets 17 secure the flanges 181–184 to the gutter 1866. Caulk 2001 is used under the flanges 181–184. These figures show the A and B holes properly cut so the gutter outlet tube 180 fits without bending.

Figure 22:
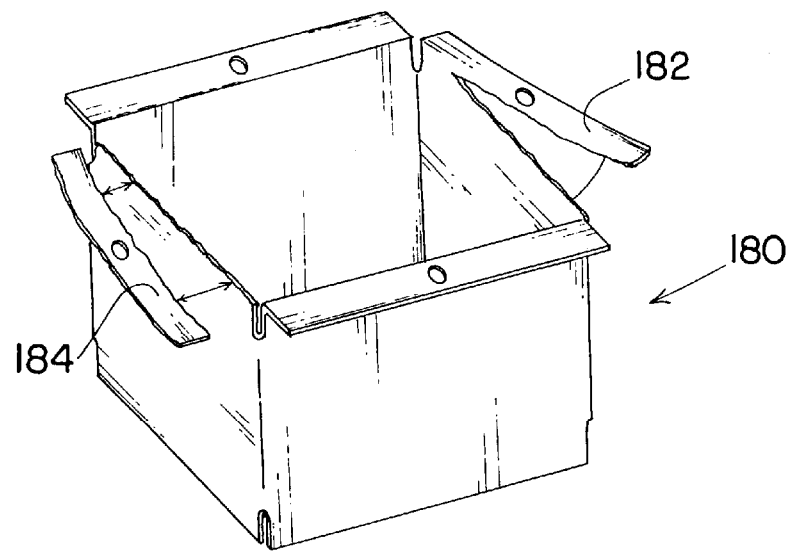
FIG. 22 is a top perspective view of a preferred embodiment completed gutter outlet tube having upper flanges trimmed away.

FIG. 22 shows flanges 184,182 being trimmed off so as to allow the gutter outlet tube 180 to fit in certain configurations.

Figure 23:
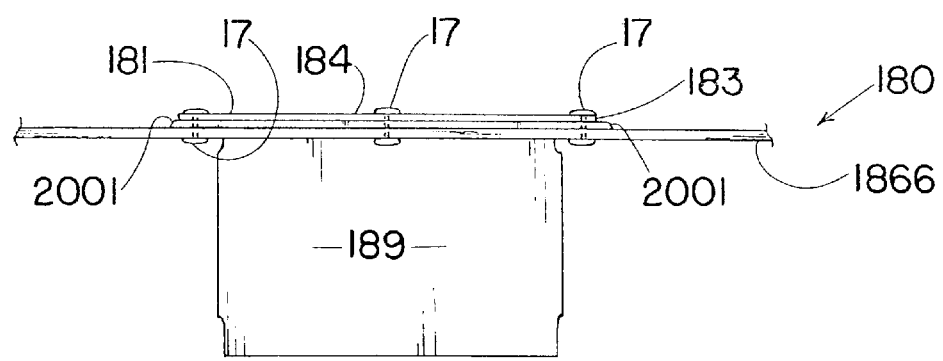
FIG. 23 is a cross sectional view taken along line 23—23 of FIG. 21.

FIG. 23 shows the proper installation of the gutter outlet tube 180 using caulk 2001.

The method to manufacture the blanks shown in FIGS. 15,16,17 as well as the special dies involved are described by viewing FIGS. 13,12,14,24,25,26,27,28 in this sequence.

Figure 13:
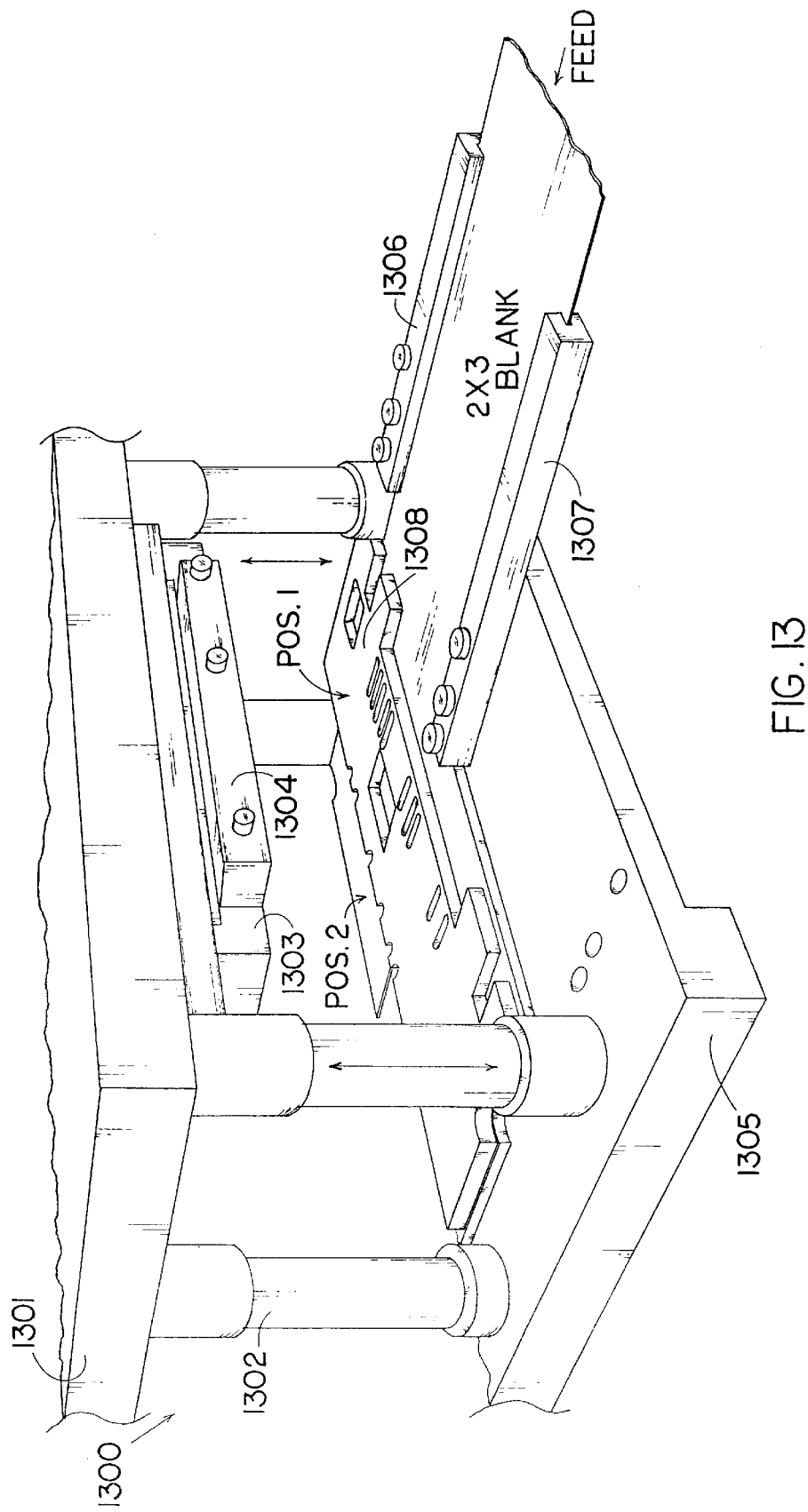
FIG. 13 is a front perspective view of the press and dies shown in FIG. 12.

FIG. 13 shows a press 1300 having a moveable upper jaw 1301, a stationary base 1305, and guide posts 1302. The upper jaw 1301 has a removable punch bar 1301 held in place by retainer 1304. A lower die 1308 guides the sheet metal stock labeled 2x3 BLANK between itself and the base 1305. The sheet metal stock 2x3 BLANK feeds in direction FEED between guides 1306,1307. Two stamping positions are first under the lower die 1308 (POS1) and second at position POS2.

Figure 12:
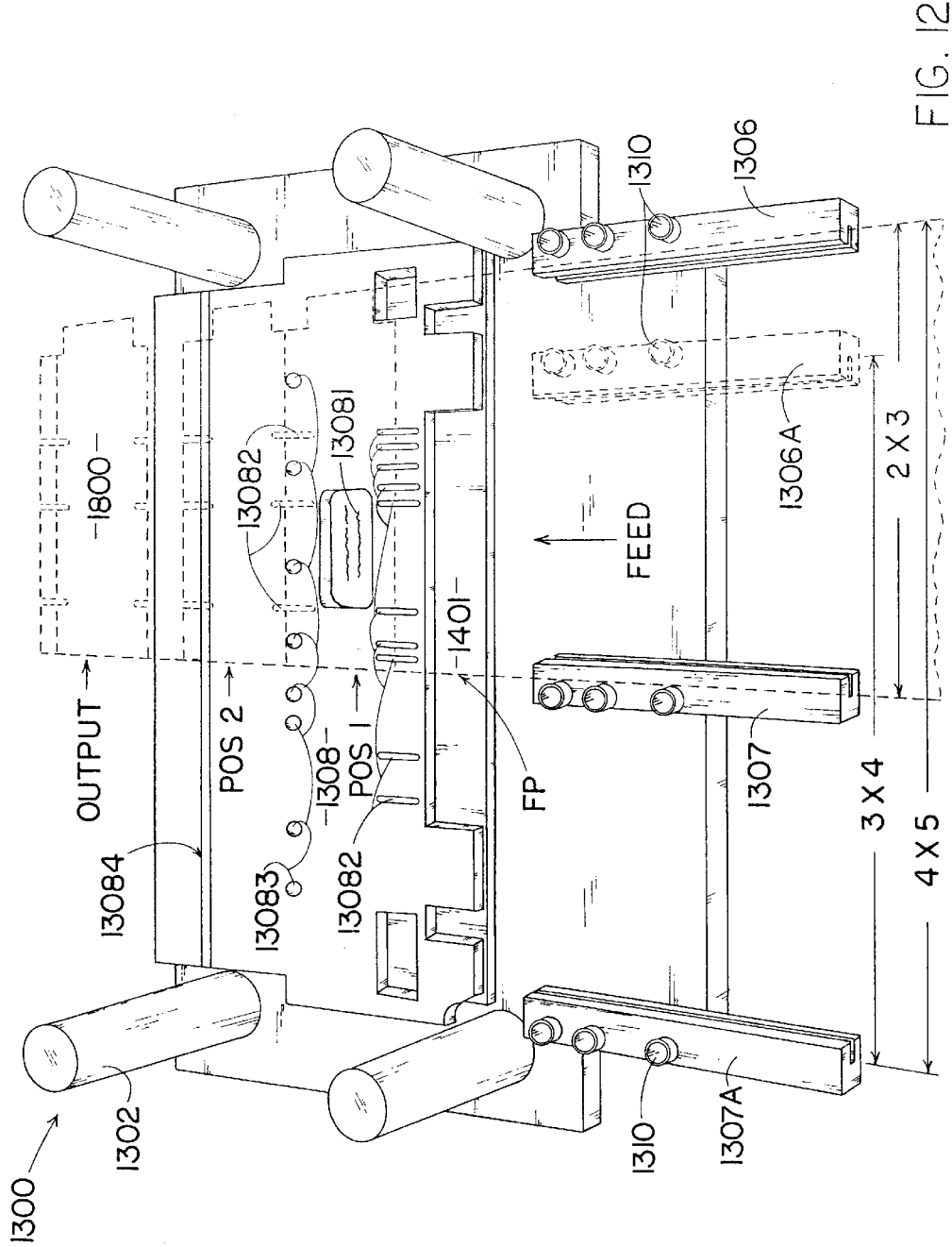
FIG. 12 is a top perspective view of the dies of a press used to stamp out the blanks shown in FIGS. 15,16,17.

FIG. 12 shows a top perspective view of the press 1300 with the upper jaw 1301 removed. Stamping positions POS1, POS2 can be seen in dotted outline. The final product, blank 1800, is shown just leaving the press 1300.

The 4x5 blanks (FIGS. 17,1779) is formed from a wider sheet metal stock which is accommodated by moving guide 1307 to position 1307A. The 3x4 blank (FIG. 16, 1679) is formed by moving guide 1307 to position 1307A, and by moving guide 1306 to position 1306A.

In order to punch the slots 185,1850, and holes 1600, and fold lines 1560–1563 the single base die 1308 has multiple receiving hole for the variety of die tools needed to pass through it for the three different runs of 2x3 or 4x5 blanks. One set of multiple elongate holes 13082 receive the slot punch out die tool. Another set of multiple round holes 13083 receive the rivet hole die tool. An insignia hole 13081 receives an insignia die tool (such as U.S. Pat. No. 1234567). A ledge 13084 forms the flange fold lines (FIG. 15, 1564–1567).

Figure 14:
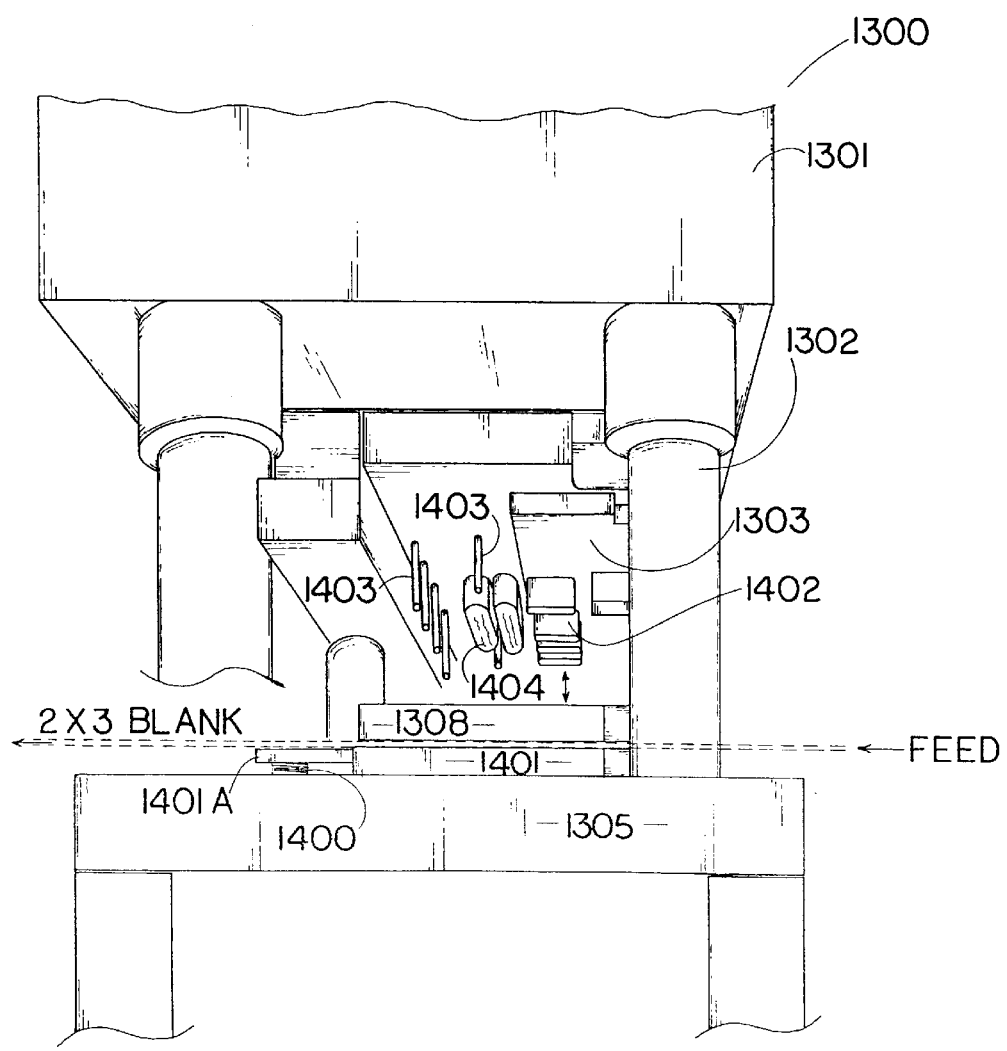
FIG. 14 is an end perspective view of the press and dies shown in FIG. 12.

Referring next to FIG. 14 the spring 1400 rests on the base 1305 and supports the base die 1401A in a floating manner known in the art. Base die 1401 is stationary. Slot punches 1402 fit through elongate holes 13082. Hole punches 1403 fit through holes 13083. Insignia punch 1404 fits through hole 13081.

Figure 24:
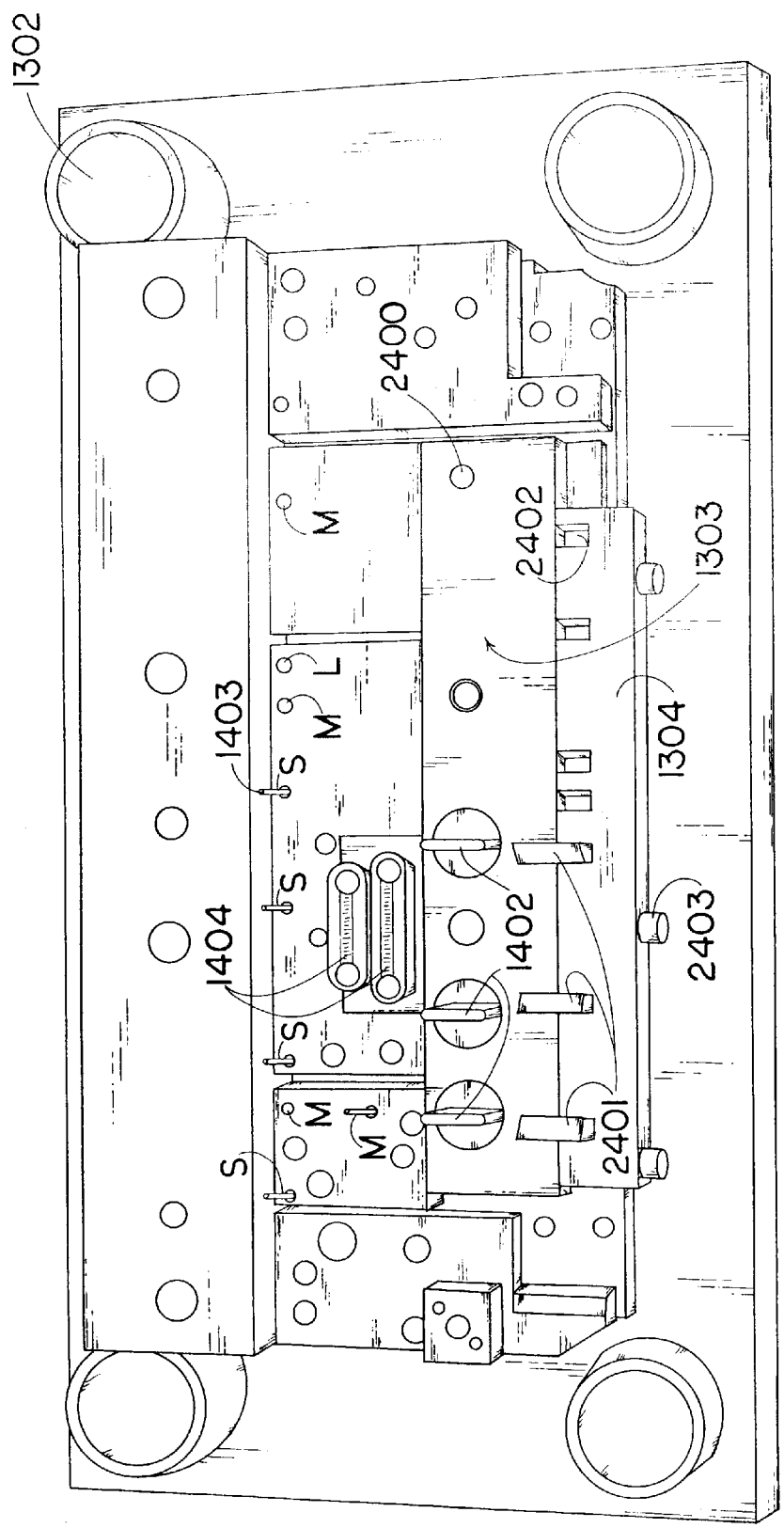
FIG. 24 is a bottom perspective view of an upper die shown in FIG. 12.
Figure 25:
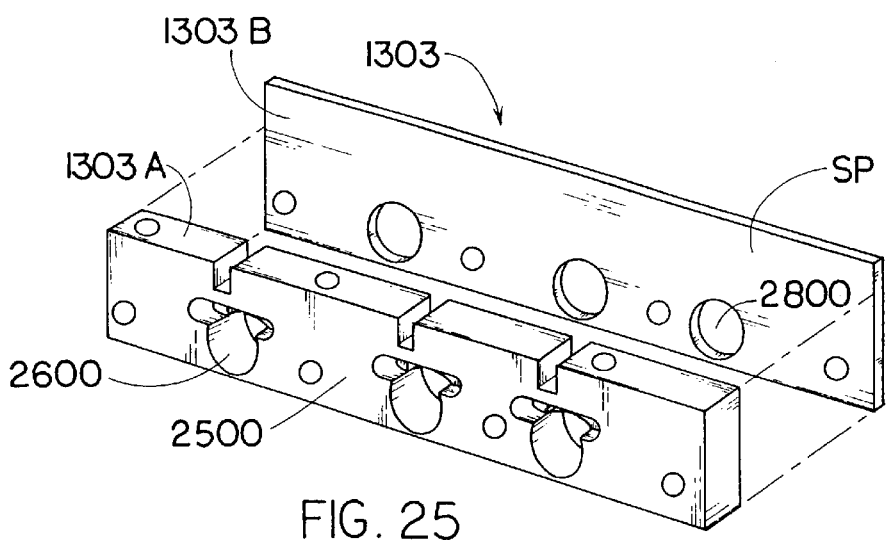
FIG. 25 is a top perspective view of an upper die segment shown in FIG. 13.
Figure 26:
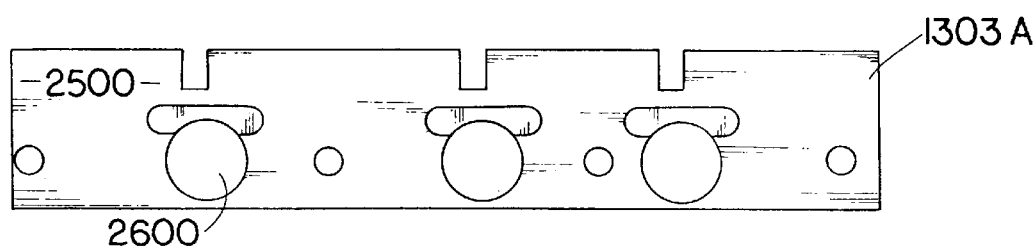
FIG. 26 is a front plan view of the die segment shown in FIG. 25.

Referring next to FIG. 24 a bottom view of the versatile removable punch bar 1303 is seen. The slot punches 1402 are moved to their proper holes 2400 depending on the run (either 2×3 or 3×4 or 4×5). The hole punches 1403 are moved to the small S or medium M or large L holes depending on the run. The fold line punches 2401 are moved to their proper holes 2402 depending on the run. The set screws 2403 hold the retainer bar 1304 to the removable punch bar 1303. Known in the art is the choice to vary the hole patterns and/or punches for new designs of blanks. Each size blank requires a custom interchangeable punch bar 1303.

Figure 27:
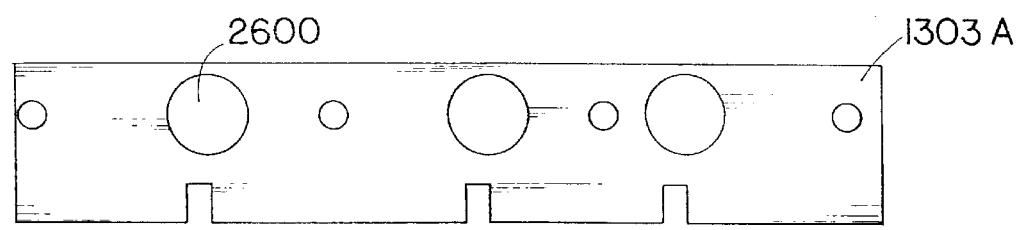
FIG. 27 is a rear plan view of the die segment panel DSP shown in FIG. 25.
Figure 28:
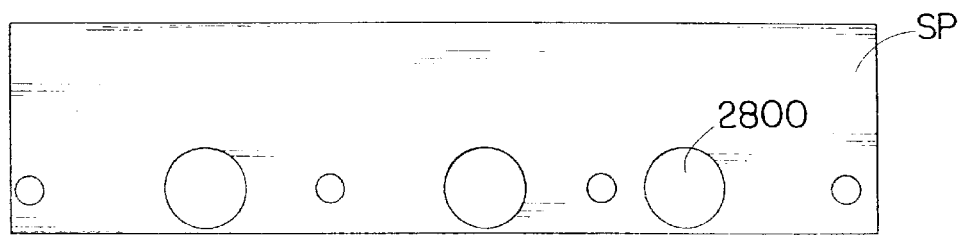
FIG. 28 is a rear plan view of the spacer plate SP shown in FIG. 25.

Referring next to FIGS. 25,26,27,28 the one embodiment for the 2×3 removable punch bar 1303 is shown, wherein the 3×4 and 4×5 removable punch bars are not shown and only vary as to hole placement. The face 2500 of the removable punch bar segment 1303A has slot punch holes 2600. FIG. 27 shows the rear plan view of removable punch bar segment 1303A. The spacer bar SP is shown to have matching holes 2800. Spacer bars are used to accommodate varying gauges of sheet metal stock.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A gutter outlet tube blank comprising:

a generally rectangular shaped sheet metal piece having four fold lines running across a longitudinal axis to enable the forming of a front, a back and a pair of side panels;

said sheet metal piece having a top edge with a plurality of fold lines enabling the forming of a plurality of flanges; and wherein at least two of said fold lines further comprise a top segment each having a slot extending below said flange fold lines and between two adjacent members of said panels, wherein a manual bending of an adjacent panel to accommodate a fit into an irregular shaped gutter hole is enabled; and wherein all said flanges project at about a 90° angle from the side panels upon a final assembly of the gutter outlet tube blank.

2. The apparatus of claim 1, wherein at least two of the fold lines running across a longitudinal axis each further comprise a bottom segment each having a slot extending to a bottom edge of said sheet metal piece, thereby enabling a manual bending of a taper at said bottom segment.

3. The apparatus of claim 1, wherein the sheet metal piece further comprises a pair of rivet holes.

4. The apparatus of claim 2, wherein said sheet metal piece has a size and said four fold lines running across a longitudinal axis have a spacing to fold into a gutter outlet tube having a hole dimension of 1½×2½ inches.

5. The apparatus of claim 2, wherein said sheet metal piece has a size and said four fold lines each have a spacing to fold into a gutter outlet tube having a hole dimension of 2½×3½ inch.

6. The apparatus of claim 2, wherein said sheet metal piece has a size and said four fold lines running across a longitudinal axis each have a spacing to fold into a gutter outlet tube having a hole dimension of 3½×4½ inch.

7. A gutter outlet tube comprising:

a front and a rear panel joined by a pair of side panels;

wherein four corners are formed by the adjoining panels;

a flange extending outbound at about a 90° angle from an upper segment of each panel;

each adjoining pair of panels forming an adjoining edge;

each adjoining edge having a slot under the extended flange, thereby enabling a bending of said panels to accommodate irregular shaped gutter holes.

* * * * *